US006628101B2

(12) United States Patent
Dymond et al.

(10) Patent No.: US 6,628,101 B2
(45) Date of Patent: Sep. 30, 2003

(54) ELECTRONIC SHORTING OF WOUND ROTOR WINDINGS

(75) Inventors: James H. Dymond, Peterborough (CA); Raymond K. J. Ong, Peterborough (CA); Dale Derr, Peterborough (CA)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/681,516

(22) Filed: Apr. 20, 2001

(65) Prior Publication Data

US 2002/0153859 A1 Oct. 24, 2002

(51) Int. Cl.[7] ................................................. H02P 1/34
(52) U.S. Cl. ....................... 318/731; 318/736; 318/825; 318/827
(58) Field of Search ................................. 318/731, 734, 318/735, 736, 778, 818, 819, 820, 821, 822, 825, 827

(56) References Cited

U.S. PATENT DOCUMENTS

| 3,810,253 A | * | 5/1974 | Vergara et al. |
| 3,823,357 A | * | 7/1974 | Sapper |
| 4,652,807 A | * | 3/1987 | Nagura ........................ 318/778 |
| 4,721,898 A | * | 1/1988 | Carter ......................... 318/827 |
| 5,068,560 A | | 11/1991 | Lundquist |
| 5,285,124 A | | 2/1994 | Satake et al. |
| 5,385,042 A | * | 1/1995 | La Belle |
| 5,530,310 A | | 6/1996 | Sauer et al. |
| 5,719,457 A | | 2/1998 | Helfer |

OTHER PUBLICATIONS

Walter N. Alerich. "Electric Motor Control", Van Nostrand Reinhold Publishing, New York, 1975. pp. 116–118.*
Stephen J. Chapman. "Electric Machinery Fundamentals", McGraw–Hill Publishing, New York, 1999. pp. 357–359.*
Raymond Ramshaw et al. "Energy Conversion: Electric Motors and Generators", Saunders College Publishing, Philadelphia, 1990, p. 300.*

* cited by examiner

*Primary Examiner*—Bentsu Ro
(74) *Attorney, Agent, or Firm*—Karl A. Vick, Esq.; Armstrong Teasdale LLP

(57) ABSTRACT

A method for shorting rotor windings in a wound rotor induction machine is disclosed. The method includes the steps of monitoring rotor current for a frequency indicative of a desired steady-state operating condition and electronically shorting the rotor windings when the monitored rotor current frequency reaches a defined threshold indicative of the desired steady-state operating condition.

26 Claims, 3 Drawing Sheets

ELECTRONIC SHORTING OF WOUND ROTOR WINDINGS

BACKGROUND OF INVENTION

This invention relates generally to rotor winding shorting on a wound rotor type induction machine and, more particularly, to methods and apparatus employing electronic circuits to short-circuit the rotor winding.

In a wound rotor motor, to provide a balanced simple winding which will result in low reactance and good performance characteristics, the rotor slots will be multiples of the poles and the phases. With the stator arranged the same way, the result gives rise to permeance locking torques at standstill or zero motor speed. Typically, to initially rotate the rotor, a high resistance is inserted into a rotor circuit to produce torque and limit current. As the angular speed of the rotor increases, the resistance is decreased. Typically, the external rotor resistance circuit is electrically connected to the rotor winding via collector (slip) rings and brushes.

As the speed approaches rated values, the windings are shorted so that a sufficient magnetic field can be induced into the rotor windings from the stator winding to produce the required torque. However, supplying a short circuit to the rotor windings through the collector rings and brushes is inefficient because of the brush wear caused by a friction between the rings and brushes. Additionally, since most brushes are carbon based, carbon dust typically accumulates in the motor from the brush wear.

Originally, shorting the collector rings was done by manual operations, such as, for example, a knife switch across the collector rings supply circuit shorts across the rotor windings, and then the brushes are manually lifted from the rings. This type of solution is not desirable, for safety purposes, when applied to high voltage, high horse-power machines.

Other methods use a motor driven plate with shorting studs which were moved into place to short the collector rings using a worm gear and an electrically driven brush lifting gear, or alternatively a plate with shorting studs is hydraulically driven into place to short the slip rings.

It is desirable to employ a method of shorting out the windings of the rotor which did not employ moving parts, thereby, enhancing the safety and reliability of such an operation. It is also desirable that such a method operates independent of the slip rings and brushes used in known machines.

SUMMARY OF INVENTION

The present invention, in one aspect, is a method for shorting rotor windings in a wound rotor induction machine, the method including monitoring rotor current for a frequency indicative of a desired steady-state operating condition and electronically shorting the rotor windings when the monitored rotor current frequency reaches a defined threshold indicative of the desired steady-state operating condition.

DETAILED DESCRIPTION

Figure 1:
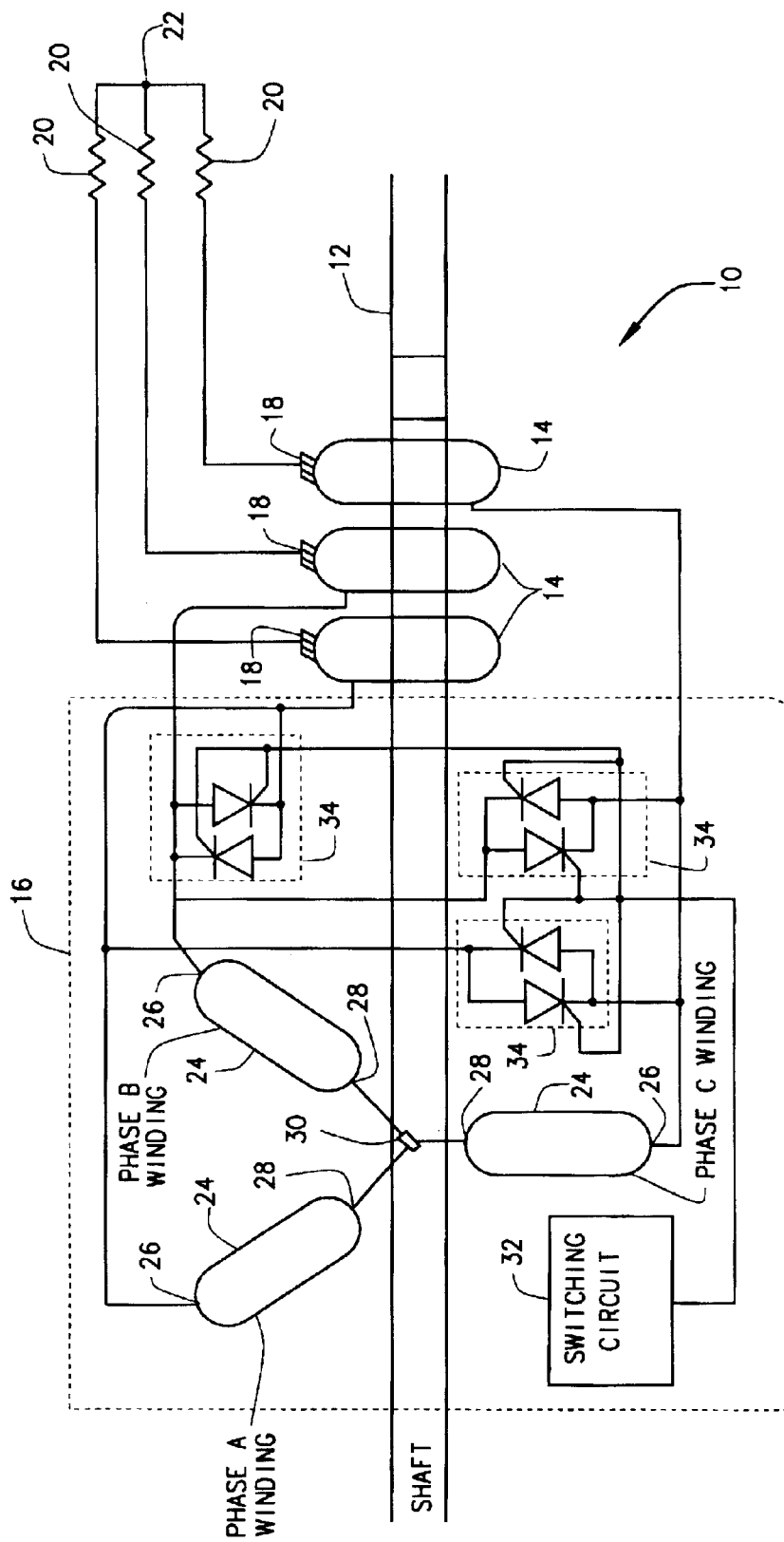
FIG. 1 is an electrical diagram of a wound rotor including a shorting circuit.

FIG. 1 is an electrical diagram of a wound rotor 10 including a shorting circuit for a wound rotor electrical machine according to one embodiment of the present invention. Referring specifically to FIG. 1, mounted along a rotor shaft 12, are a plurality of collector rings 14 and a rotor circuit 16. In electrical contact with collector rings 14 are a plurality of brushes 18, which, in the embodiment shown in FIG. 1, provide electrical contact between the collector rings 14 and a network of resistors 20 connected at a common point 22.

Rotor circuit 16 is also in electrical contact with collector rings 14. Collector rings 14 provide for electrical contact with rotor windings 24. In the embodiment shown, rotor windings 24 illustrate a three-phase winding. As shown in FIG. 1, each rotor winding 24 includes a first contact 26 and a second contact 28. First contacts 26 of windings 24 are each electrically connected to one of collector rings 14. Second contacts 28 of windings 24 are electrically connected together at a common node 30 thereby configuring the windings 24 into what is commonly known in the art as a Wye or Y configuration.

As explained previously, if collector rings 14 are shorted at stand-still in a wound rotor induction motor, permeance locking can occur when power is applied to a stator (not shown), and, therefore, rotor shaft 12 may not rotate. To initiate rotor shaft 12 rotation, resistors 20 are switched into rotor circuit 16 via collector rings 14 and brushes 18 to generate torque to rotate shaft 12. The torque is caused by the magnetic field from a plurality of stator windings (not shown) being induced into rotor windings 24. As the speed of rotor shaft 12 increases, sections of resistors 20 are removed from rotor circuit 16. To reduce brush 18 and collector ring 14 wear and reduce the amount of dust within the motor, a mechanism (not shown) is used to position collector rings 14 such that brushes 18 do not contact collector rings 14.

If resistors 20 are variable in resistance, the resistance in the circuit can be varied to control the speed of the motor. To operate the motor at a constant speed, resistors 20 are removed from rotor circuit 16 and rotor windings 24 are shorted. Known methods of shorting rotor windings 24 mechanically through collector rings 14 present safety issues due to the higher rotor currents in larger motors which exceed 1000 amperes.

Rotor circuit 16 includes an electronic circuit used to short rotor windings 24 when rotor shaft 12 rotates at rated speed. The circuit includes a switching circuit 32 and a plurality of gated silicon controlled rectifier circuits 34 arranged in parallel. Gated silicon controlled rectifier circuits 34, when turned on, tend to act as electrical shorts. Since the motor is an alternating current machine, gated silicon controlled rectifier circuits 34 are configured as a double three phase bridge because of the reversing alternating current in the rotor. Each phase of the bridge includes two silicon controlled rectifiers electrically connected. The silicon controlled rectifiers are connected so that there is a short circuit for both directions of the alternating current. Gated silicon controlled rectifier circuits 34 are enabled, or turned on, by switching circuit 32.

In an exemplary embodiment, switching circuit 32 is configured to recognize a frequency of the rotor current. As rotor shaft 12 gains speed upon application of power to the stator and applied resistance to rotor windings 24, the rotor current frequency decreases. The rotor frequency decreases since the rotating magnetic fields of the stator windings are cutting through rotor windings 24 at a lower rate due to rotor 12 accelerating to the speed of the revolving magnetic field. At rated speed for certain motors, the rotor frequency is as low as or less than one Hertz.

Typical motors have a rotor current frequency of less than 0.5 Hertz. Switching circuit 32 is configured to recognize rotor frequency, as stated above, and further configured to provide a signal to turn on gated silicon controlled rectifier circuits 34 to short rotor windings 24. Shorting of rotor windings 24 results in rotor 12 rotating at a constant speed near synchronous speed.

In the embodiment shown in FIG. 1, rotor current frequency is used to select a motor operating speed using switching circuit 32 and gated silicon controlled rectifier circuits 34. Although the embodiment described uses gated silicon controlled rectifiers as the electronic mechanism for shorting rotor windings 24, other electronic circuit choices are contemplated, such as, for example, but not limited to, diodes, rectifiers and power transistors.

Figure 2:
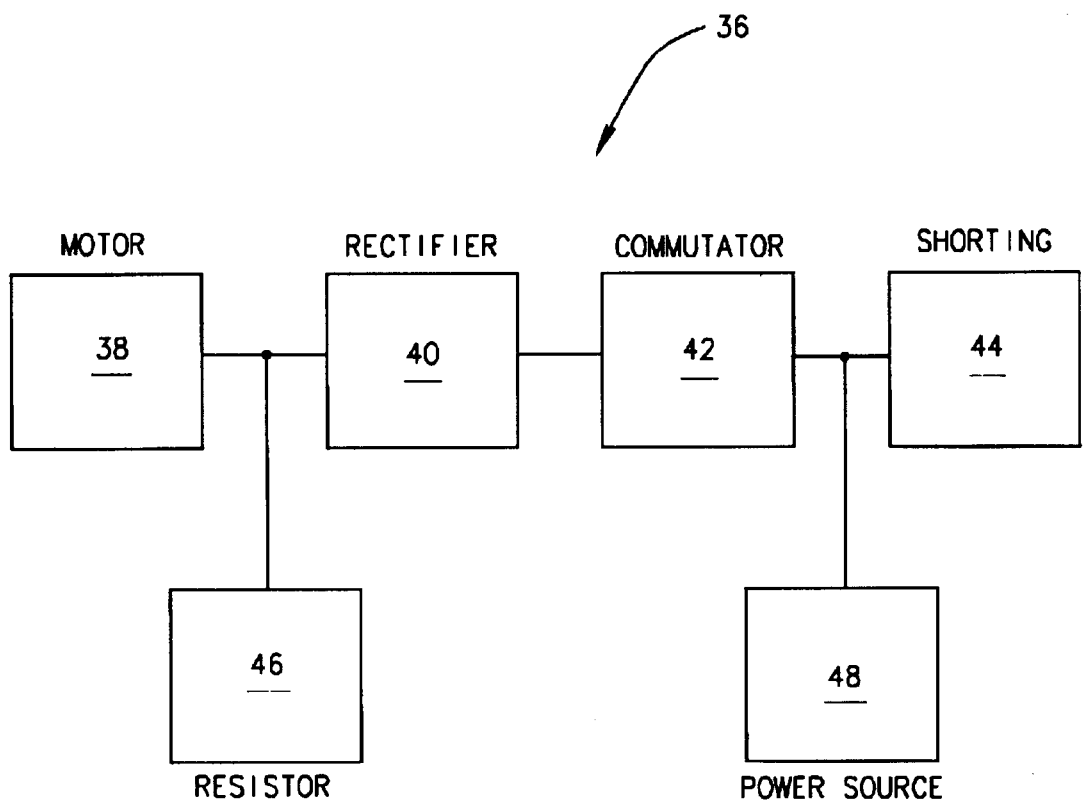
FIG. 2 is a top level schematic view of a shorting circuit.

FIG. 2 is a top level schematic view of shorting circuit 36 including a wound rotor motor 38, a rectifier circuit 40, a commutator circuit 42, a shorting sub-circuit 44, a resistor circuit 46, and a power source circuit 48. Resistor circuit 46 provides an external resistance to start motor 38. Once motor 38 attains rated speed, the external resistance is removed and rectifier circuit 40 and shorting sub-circuit 44 are utilized to short a plurality of rotor windings (not shown in FIG. 2) of motor 38. Power source circuit 48 provides power to commutator circuit 42 and shorting sub-circuit 44. In an exemplary embodiment, power source circuit 48 controls commutator circuit 42 and shorting sub-circuit.

Figure 3:
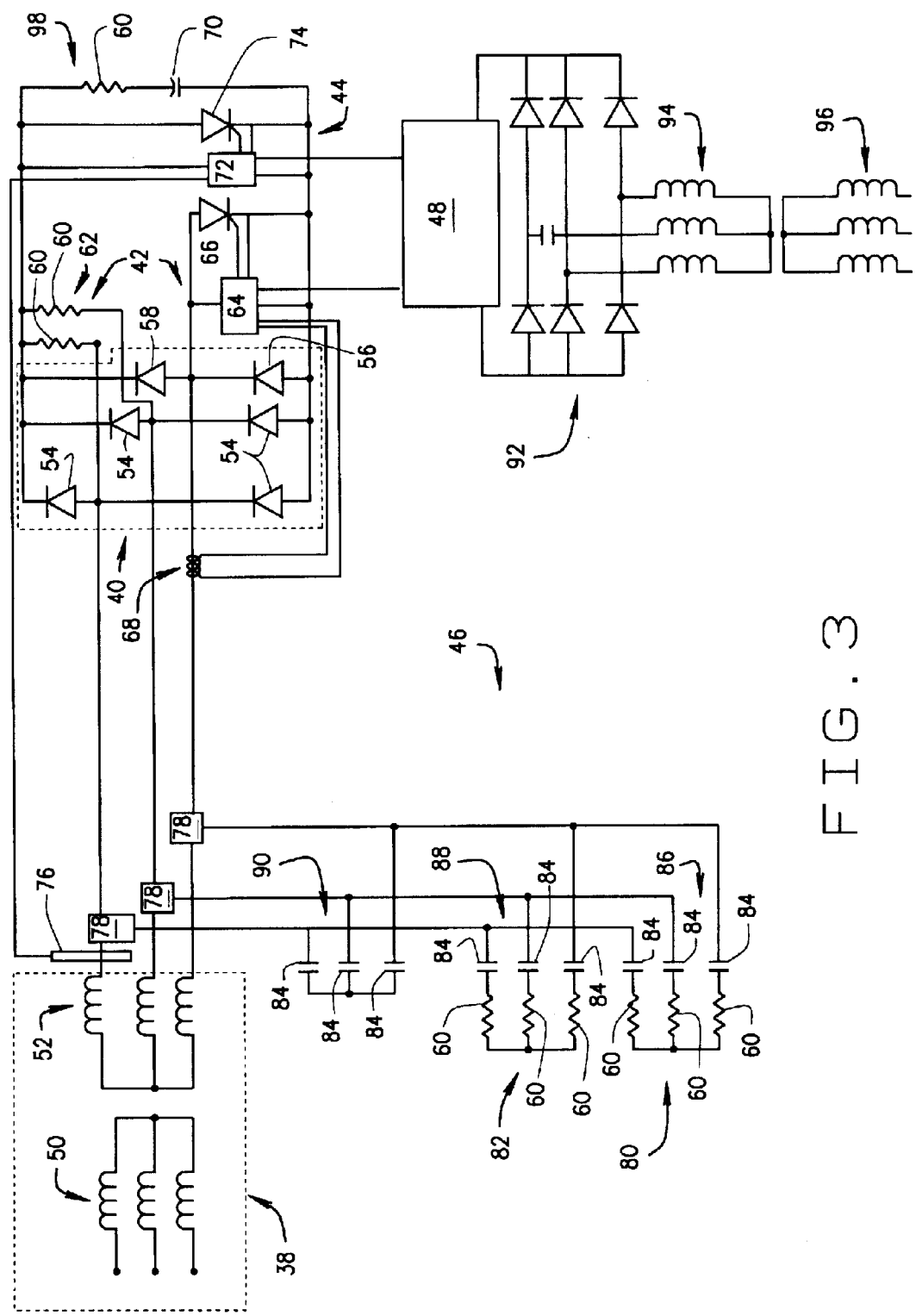
FIG. 3 is a detailed schematic view of the shorting circuit shown in FIG. 2.

FIG. 3 is a detailed schematic view of the shorting circuit shown in FIG. 2. Wound rotor motor 38 includes a plurality of stator windings 50 and a plurality of rotor windings 52. Rectifier circuit 40 includes a plurality of silicon controlled rectifiers 54, a first third-phase silicon controlled rectifier 56, and a second third-phase silicon controlled rectifier 58. Commutator circuit 42 includes a plurality of resistors 60 forming a commutator resistor group 62. Commutator circuit 42 further includes a first gating circuit 64 connected to a gated silicon controlled rectifier 66 and a current monitor 68. Shorting sub-circuit 44 includes a resistor 60, a capacitor 70, and a second gating circuit 72 connected to a gated silicon controlled rectifier 74 and a current sensor 76. Resistor circuit 46 includes a plurality of resistors 60 and a plurality of slip rings 78. More specifically, resistor circuit 46 includes a first resistor group 80 and a second resistor group 82. Resistor circuit 46 further includes a plurality of connectors 84 arranged to form a first connector group 86, a second connector group 88, and a third connector group 90. Power source circuit 48 includes a diode bridge 92 and a first three-phase winding 94. A second three-phase winding 96 is connected to a stationary circuit (not shown).

During a start up of motor 38, first resistor group 80 is electrically connected to slip rings 78 by closing first connector group 86. Slip rings 78 are electrically connected to rotor windings 52. When stator windings 50 are energized, a voltage is induced within rotor windings 52 and a slip of 1 (one) allows electrical current to flow through resistors 60 of first resistor group 80 thereby rotating a rotor shaft (not shown) having a rated speed. When the rotor shaft approaches approximately 50% of the rated speed, second connector group 88 is closed to allow current flow through second resistor group 82. Since second resistor group 82 is connected in parallel to first resistor group 80, current flow through rotor windings 52 is increased enabling the rotor to obtain a speed approximately equal to the rated speed. When the rotor approximates the rated speed third connector group 90 is closed to short rotor windings 52. Accordingly, the rotor attains rated speed. For simplicity, the embodiment shown includes three groupings (80, 82, and 90). However, it is contemplated that the benefits accrue to circuits having more than three groupings. In one embodiment, there are between four and seven resistance groupings.

Since the rotor is at rated speed, the slip is between 0.5% and 1.5% and, therefore, the frequency of the current through the rotor windings 52 is less than approximately 1.0 Hertz. Current sensor 76 is configured to provide a signal to second gating circuit 72 when the rotor current frequency falls to approximately 1.0 Hertz. Second gating circuit 72 then gates gated silicon controlled rectifier 74 going backwards to the plurality of silicon controlled rectifiers 54. Accordingly, silicon controlled rectifiers 54, 56, 58, and gated silicon controlled rectifier 74 constitute a full wave diode bridge which takes three conductors (not shown) from slip rings 78 and rectifies the conductors to a DC voltage and, thus, shorting rotor windings 52. Prior to being gated, gated silicon controlled rectifier 74 was open preventing current flow therethrough. Resistor 60 and capacitor 70 form a resistor compactor circuit 98 preventing a false firing of gated silicon controlled rectifier 74 by limiting the rate of rise of voltage across gated silicon controlled rectifier 74. A mechanism (not shown) positions slip rings 78 such that the brushes (not shown) are lifted to reduce wear and dust.

In an exemplary embodiment, first gating circuit 64 detects the DC voltage through current monitor 68 and sends a signal to power source circuit 48. Power source 48 then opens one phase of diode bridge 92 producing a nonsymmetrical loading on second three phase winding 96. A stationary circuit (not shown) interprets the nonsymmetrical loading and positions slip rings 78 such that the brushes are lifted.

Additionally, the short circuit through gated silicon controlled rectifier 74 is removable. After slip rings 78 are repositioned such that the brushes are in electrical contact with the rotor (not shown), and connector 84 reconnects group 90 to the brushes, the stationary circuit reverses power to second three phase winding 96 providing a change in frequency detectable by power source circuit 48. The change in frequency is interpreted by power source circuit 48 that slip rings 78 are repositioned and group 90 is engaged. Power source circuit 48 sends a signal to first gating circuit 64. First gating circuit 64 gates gated silicon controlled rectifier 66 such that gated silicon controlled rectifier 66 acts as a short. Accordingly, the voltage across first third-phase silicon controlled rectifier 56 is lower than the forward voltage drop across second third-phase silicon controlled rectifier 58 and silicon controlled rectifier 74. Current flow through gated silicon controlled rectifier 74 is removed and the gate of silicon controlled rectifier 74 shuts off. Gate controlled rectifier 66 self commutates off when reversed biased by voltage from resistor group 62 and rectifier 54 when the third phase voltage is the lowest of the three phases.

Accordingly, a wound rotor type induction machine is started with brushes engaged, the brushes are disengaged to reduce wear and extend the life of the machine, and then the brushes are re-engaged if desired.

While the invention has been described in terms of various specific embodiments, those skilled in the art will recognize that the invention can be practiced with modification within the spirit and scope of the claims.

What is claimed is:

1. A method for shorting rotor windings in a wound rotor induction machine including a rotor and a plurality of slip rings electrically connected to the rotor windings, said method comprising the steps of:

monitoring rotor current for a frequency indicative of a desired steady-state operating condition; and imposing an electrical short between the plurality of slip rings and the rotor windings, with rotor current flowing through an electronic shorting device, when the monitored rotor current frequency reaches a defined threshold indicative of the desired steady-state operating condition such that when a plurality of brushes in electrical contact with the slip rings are removed from electrical contact with the slip rings, the electrical short between the plurality of slip rings and the rotor windings though the electronic shorting device is maintained.

2. A method according to claim 1 wherein said step of monitoring rotor current further comprises the step of using a switching circuit to monitor rotor current frequency.

3. A method according to claim 2 wherein said step of using a switching circuit further comprises the step of configuring a switching circuit to provide a signal when rotor current frequency reaches a defined threshold.

4. A method according to claim 3 wherein said step of configuring a switching circuit further comprises the step of providing a signal when rotor current frequency is less than one Hertz.

5. A method according to claim 1 further comprising the step of positioning a plurality of slip rings such that a plurality of brushes are not in electrical contact with the rotor.

6. A method according to claim 5 wherein said step of positioning further comprises the step of producing a non-symmetrical loading on a three phase winding connected to a stationary circuit.

7. A method according to claim 6 wherein said step of producing further comprises the step of opening at least one phase of a diode bridge.

8. A method according to claim 6 further comprising the step of interpreting the nonsymmetrical loading.

9. A method according to claim 5 wherein said step of positioning further comprises the step of configuring a power source circuit and a stationary circuit to communicate therebetween.

10. A method according to claim 9 wherein said step of configuring further comprises the step of configuring the power source circuit and the stationary circuit to communicate therebetween via a first three-phase winding of the power source circuit and a second three-phase winding of the stationary circuit.

11. A method according to claim 3 wherein said step of configuring a switching circuit further comprises the step of using the signal to turn on a gated silicon controlled rectifier circuit to create a short between the windings of the rotor.

12. A method according to claim 11 further comprising the step of configuring the gated silicon controlled rectifier circuit as a bridge circuit.

13. A wound rotor induction motor comprising:

a stator comprising a plurality of stator windings;

a rotor magnetically coupled to said stator and comprising a plurality of rotor windings;

a plurality of slip rings on said rotor electrically connected to said rotor windings, said slip rings enabling electrical connections to said rotor windings;

a plurality of brushes configured to make and break electrical contact with said rotor during steady state operation of said motor; and an electronic circuit on said rotor configured to impose an electrical short between said plurality of slip rings and said rotor windings, with rotor current flowing through an electronic shorting device, permitting said brushes to break electrical contact with said rotor while maintaining the electrical short between said plurality of slip rings and said rotor windings through the electronic shorting device.

14. A motor according to claim 13 wherein said electronic circuit further configured to monitor rotor current frequency.

15. A motor according to claim 13 wherein said electronic circuit further configured to short said slip rings when rotor current frequency reaches a defined threshold.

16. A motor according to claim 15 wherein the rotor current frequency threshold is one Hertz.

17. A motor according to claim 13 wherein said electronic circuit further configured to short said slip rings on said rotor between said slip rings and said rotor windings.

18. A motor according to claim 13 further comprising a mechanism to position said slip rings such that said brushes are not in electrical contact with said rotor.

19. A motor according to claim 13 wherein said electronic circuit further comprises a gated silicon controlled rectifier circuit configured to short said slip rings when turned on.

20. A motor according to claim 19 wherein said gated silicon controlled rectifiers circuit further comprises a bridge circuit.

21. A motor according to claim 13 wherein said electronic circuit is powered by rotor currents.

22. A motor according to claim 13 further comprising:

a power source circuit electrically connected to said rotor; and a stationary circuit magnetically coupled to said power source circuit.

23. A motor according to claim 22 wherein said power source circuit configured to communicate with said stationary circuit.

24. A motor according to claim 22 wherein said stationary circuit comprises a plurality of windings, said stationary circuit configured to interpret a nonsymmetrical loading on said windings.

25. A motor according to claim 22 wherein said power source circuit comprises a diode bridge.

26. A wound rotor induction motor comprising:

a stator comprising a plurality of stator windings;

a rotor magnetically coupled to said stator and comprising a plurality of rotor windings;

a plurality of slip rings on said rotor electrically connected to said rotor windings, said slip rings enabling electrical connections to said rotor windings; and an electronic circuit on said rotor configured to impose an electrical short on said rotor between said plurality of slip rings and said rotor windings, said electronic circuit powered by a power source circuit mounted on said rotor.

* * * * *

UNITED STATES PATENT AND TRADEMARK OFFICE
CERTIFICATE OF CORRECTION

PATENT NO.    : 6,628,101 B2
DATED         : September 30, 2003
INVENTOR(S)   : Dymond et al.

It is certified that error appears in the above-identified patent and that said Letters Patent is hereby corrected as shown below:

Column 5,
Line 17, delete "though" and insert therefor -- through --.

Signed and Sealed this

Thirtieth Day of August, 2005

JON W. DUDAS
*Director of the United States Patent and Trademark Office*